United States Patent
Takeuchi

(10) Patent No.: US 9,563,068 B2
(45) Date of Patent: Feb. 7, 2017

(54) IMAGE SHAKE CORRECTION DEVICE, CONTROL METHOD THEREOF, AND IMAGE PICKUP APPARATUS

(71) Applicant: CANON KABUSHIKI KAISHA, Tokyo (JP)

(72) Inventor: Kenji Takeuchi, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/791,806

(22) Filed: Jul. 6, 2015

(65) Prior Publication Data

US 2016/0018666 A1 Jan. 21, 2016

(30) Foreign Application Priority Data

Jul. 16, 2014 (JP) .................................. 2014-145760

(51) Int. Cl.
*H04N 5/232* (2006.01)
*G03B 27/64* (2006.01)
*G02B 27/64* (2006.01)

(52) U.S. Cl.
CPC ........ *G02B 27/646* (2013.01); *H04N 5/23258* (2013.01); *H04N 5/23287* (2013.01)

(58) Field of Classification Search
CPC .............. G02B 27/646; H04N 5/23258; H04N 5/23287

USPC .......................................... 348/208.7, 208.11
See application file for complete search history.

(56) References Cited

U.S. PATENT DOCUMENTS

| 2009/0262425 | A1* | 10/2009 | Kimura ..................... G03B 5/00 359/557 |
| 2010/0118402 | A1* | 5/2010 | Washisu ............... G02B 27/646 359/557 |
| 2014/0211030 | A1* | 7/2014 | Hideshima ............... G03B 5/00 348/208.11 |
| 2015/0172546 | A1 | 6/2015 | Takeuchi |
| 2015/0172548 | A1 | 6/2015 | Takeuchi |

FOREIGN PATENT DOCUMENTS

JP 2001-249276 A 9/2001

* cited by examiner

*Primary Examiner* — Albert Cutler
(74) *Attorney, Agent, or Firm* — Fitzpatrick, Cella, Harper & Scinto

(57) ABSTRACT

An image shake correction device comprising a first image shake correction lens and a second image shake correction lens for correcting an image shake of a subject image caused by shaking is provided. The image shake correction device executes correcting the image shake caused by the drive of the first image shake correction lens and the second image shake correction lens after correcting a drive deviation between the first image shake correction lens and the second image shake correction lens.

10 Claims, 9 Drawing Sheets

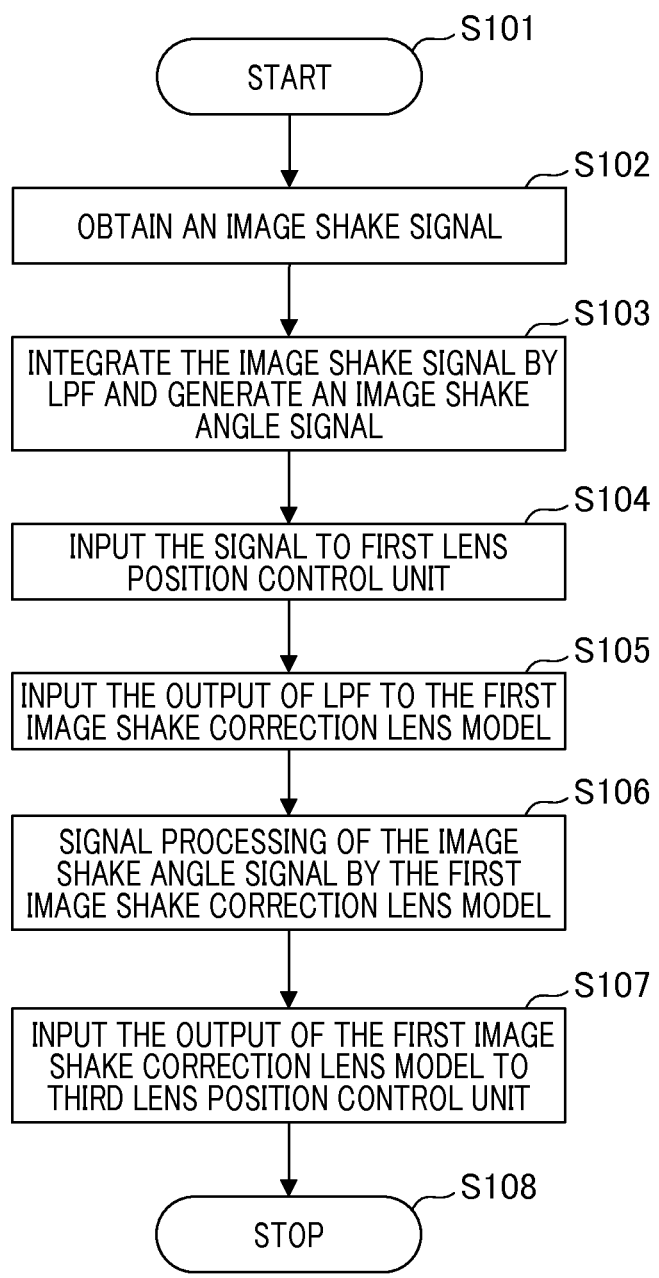

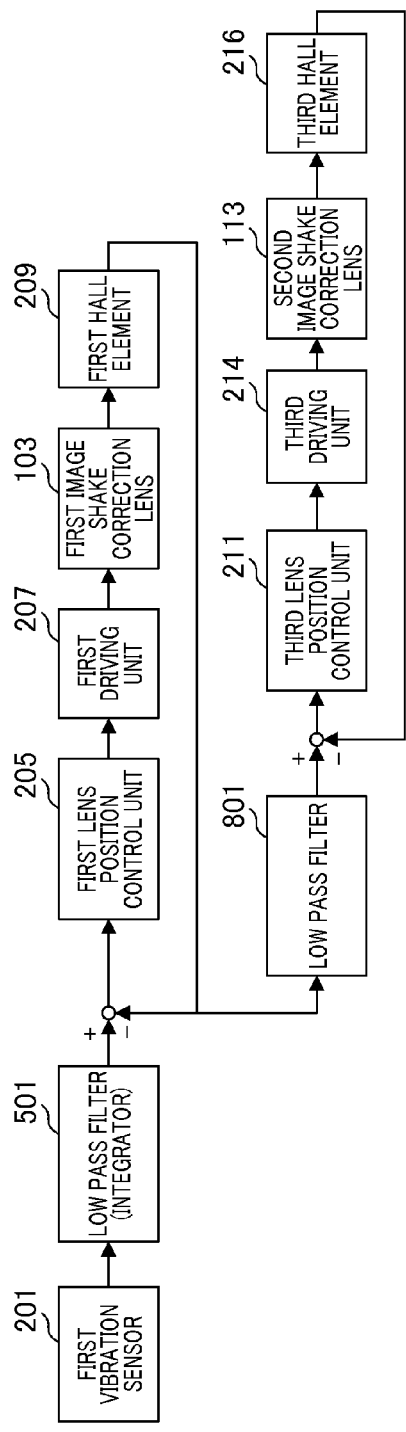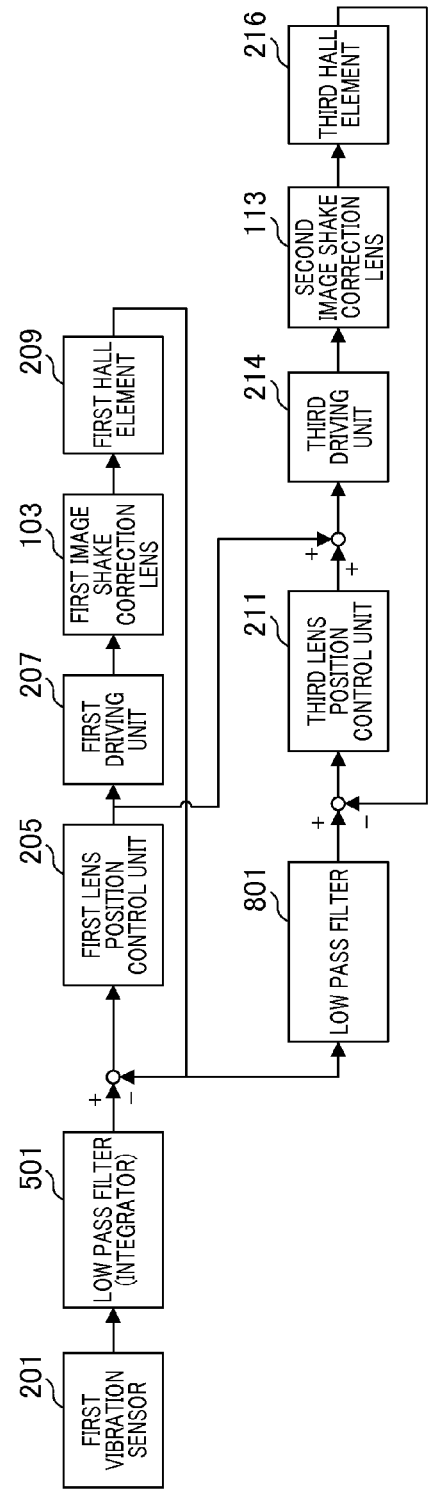

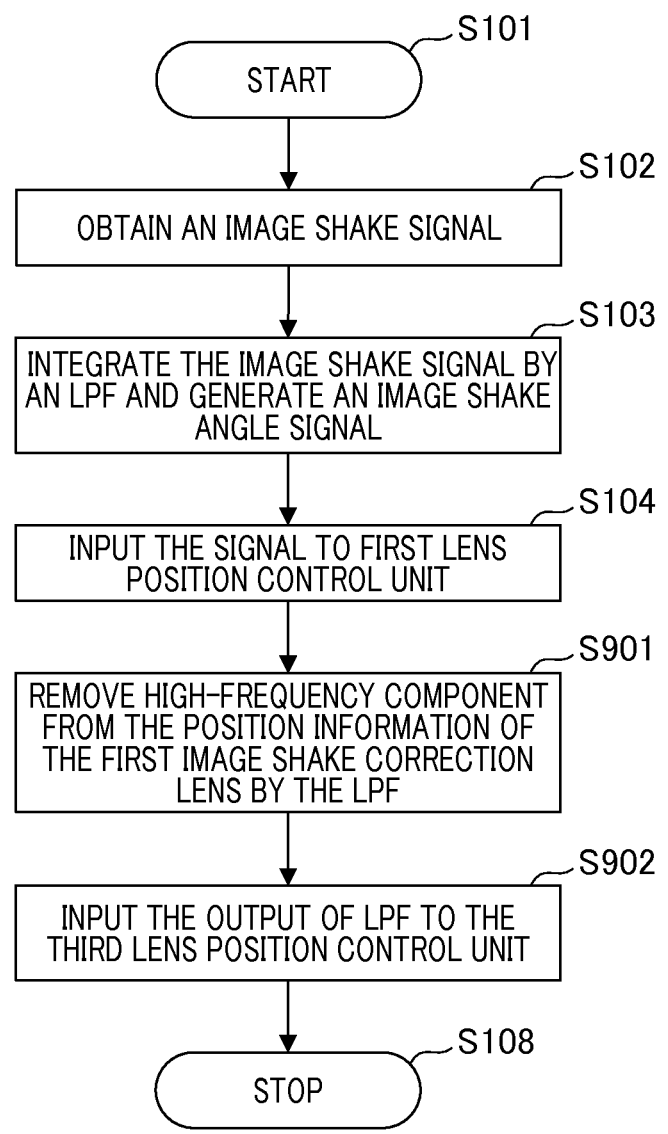

IMAGE SHAKE CORRECTION DEVICE, CONTROL METHOD THEREOF, AND IMAGE PICKUP APPARATUS

BACKGROUND OF THE INVENTION

Field of the Invention

The present invention relates to an image shake correction device, a control method thereof, and an image pickup apparatus.

Description of the Related Art

There are cases in which a subject image is shaken (image shake) due to the shaking of a user's hand holding a camera body (causes hand shake) while capturing an image by an image pickup apparatus, such as a digital camera. There has been proposed an image pickup apparatus comprising an image shake correction unit that corrects this image shake.

Optical image shake correction processing and electronic image shake correction processing have conventionally been used as correction processing by the image shake correction unit. The optical image shake correction processing detects a vibration applied to the camera body by using, for example, an angular velocity sensor, and moves an image shake correction lens, which is provided inside an imaging optical system, according to the detected result. Hence, an optical axis direction of the imaging optical system is changed, and an image to be imaged on a light-receiving surface of an imaging element is moved so that the image shake is corrected. Additionally, in the electronic image shake correction processing, image processing is performed on a captured image, and the image shake is artificially corrected.

Japanese Patent Laid-Open No. 2001-249276 discloses an image shooting lens that corrects an image shake by moving a plurality of lens groups in a direction different from the optical axis.

The image shooting lens disclosed in Japanese Patent Laid-Open No. 2001-249276 integrally moves the plurality of lens groups in a direction different from the optical axis, or integrally rotates the lens groups around the vicinity of a barycentric position of the lens groups. Additionally, the drive of the lens groups is integrally performed by using the same drive mechanisms, and thus, increases in the size of the apparatus are minimized. However, when the lens groups are integrally driven by using the same drive mechanisms as in the case of this image shooting lens, the arrangements of the lens, the arrangements of the drive mechanism, and like are restricted, and thus, the flexibility of design work may be lost.

In a case where a plurality of lenses are separately driven, when the drive phases of the plurality of lenses serving as the correction unit for correcting the image shake are coincident and the lenses are driven in synchronization, the deterioration of the optical performance does not occur. However, when the drive phases of the lenses are not coincident, the deterioration of the optical performance occurs. Accordingly, when the deterioration of the optical performance sometimes occurs, in particular during shooting a moving image and the like, the quality of the shot moving image is low.

SUMMARY OF THE INVENTION

The present invention provides an image shake correction device that allows driving a plurality of correction units in synchronization and correcting an image shake.

An image shake correction device of one embodiment of the present invention comprises: first correction unit configured to correct an image shake of a subject image caused by shaking; and second correction unit configured to correct an image shake of a subject image caused by shaking that the first and second correction units are different location in an optical axis; and a control unit configured to control an execution of the correction of the image shake by a control of the first and second correction units after correcting a drive deviation between the first correction unit and the second correction unit.

According to the image shake correction device of the present invention, it is possible to drive the plurality of correction units in synchronization and correct the image shake.

Further features of the present invention will become apparent from the following description of exemplary embodiments with reference to the attached drawings.

BRIEF DESCRIPTION OF THE DRAWINGS

FIG. 7 is a diagram illustrating a frequency characteristic of the first image shake correction lens model according to the first embodiment.

FIG. 8A and FIG. 8B are block diagrams illustrating the internal configuration of the image shake correction control unit and the lens control unit according to a second embodiment.

FIG. 9 is a flowchart that explains the target position calculation processing of the image shake correction lens according to the second embodiment.

DESCRIPTION OF THE EMBODIMENTS

First Embodiment

Figure 1:
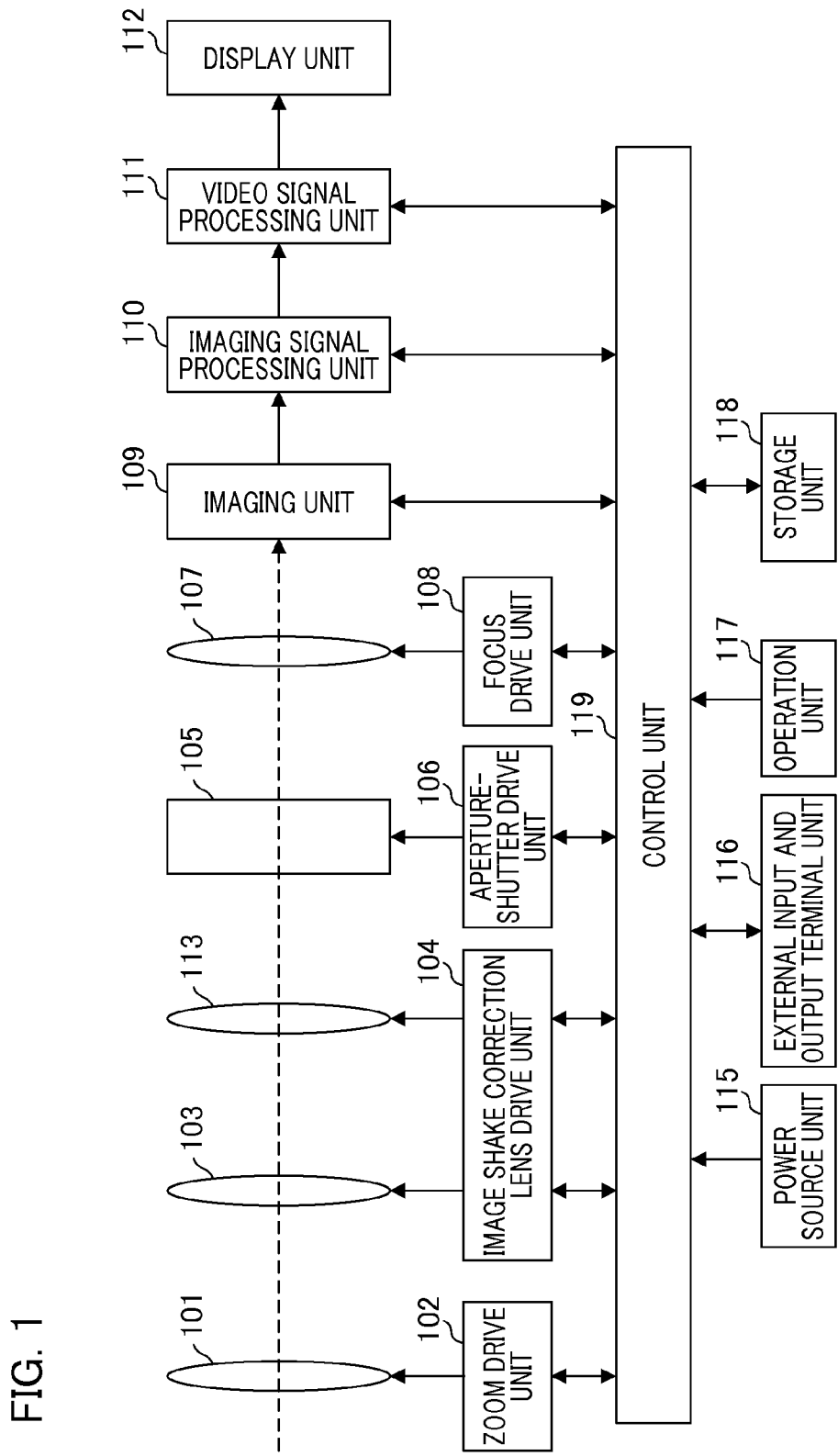
FIG. 1 is a diagram illustrating a configuration example of an image pickup apparatus of the present embodiments.

FIG. 1 is a diagram illustrating a configuration example of an image pickup apparatus of the present embodiment. The image pickup apparatus shown in FIG. 1 is a digital still camera. Note that the image pickup apparatus of the present embodiment may have a moving image shooting function.

The image pickup apparatus shown in FIG. 1 comprises a zoom unit 101, a zoom drive unit 102, a first image shake correction lens 103, an image shake correction lens drive unit 104, an aperture/shutter unit 105, an aperture/shutter drive unit 106, a focus lens 107, a focus drive unit 108, an imaging unit 109, an imaging signal processing unit 110, a video signal processing unit 111, a display unit 112, a second image shake correction lens 113, a power source unit 115, an external input and output terminal unit 116, an operation unit 117, a storage unit 118, and a control unit 119. The zoom unit 101 is a part of a variable magnification image shooting lens that configures an imaging optical system. The zoom unit 101 has a zoom lens that changes the magnification of the image shooting lens. The zoom drive unit 102 controls the drive of the zoom unit 101 according to the control of the control unit 119. The first image shake correction lens 103 is a first correction unit that corrects an image shake caused by shaking applied to the apparatus. The first image shake correction lens 103 is configured so as to be movable in an orthogonal direction with respect to an optical axis of the image shooting lens. The image shake correction lens drive unit 104 controls the drive of the first image shake correction lens 103. The second image shake correction lens 113 is a second correction unit that corrects the image shake caused by the shake applied to the apparatus. The second image shake correction lens 113 has a configuration that is equivalent to that of the first image shake correction lens 103, and is driven and controlled by the image shake correction lens drive unit 104.

The aperture/shutter unit 105 is a mechanical shutter having an aperture function. The aperture/shutter drive unit 106 drives the aperture/shutter unit 105 according to the control of the control unit 119. The focus lens 107 is a part of the image shooting lens, and is configured so as to enable changing the position along the optical axis of the image shooting lens. The focus drive unit 108 drives the focus lens 107 according to the control of the control unit 119.

The imaging unit 109 converts an optical image produced by the image shooting lens into an electric signal in pixel units by using an imaging element, for example, a CCD image sensor and a CMOS image sensor. CCD is an abbreviation for "Charge Coupled Device". CMOS is an abbreviation for "Complementary Metal-Oxide". The imaging signal processing unit 110 performs, for example, A/D conversion, correlated doubling sampling, gamma correction, white balance correction, and color interpolation processing on the electric signal output from the imaging unit 109, and then converts the result into a video signal. The video signal processing unit 111 processes the video signal output from the imaging signal processing unit 110 depending on the use. Specifically, the video signal processing unit 111 generates a display video or performs encoding and data filing for recording.

The display unit 112 displays an image as necessary based on the display video signal output from the video signal processing unit 111. The power source unit 115 provides a power source to the entire image pickup apparatus according to the use. The external input and output terminal unit 116 input and output a communication signal and the video signal to and from external devices. The operation unit 117 has a button and a switch for providing an instruction to the image pickup apparatus from a user. The storage unit 118 stores various data, including video information. The control unit 119 has, for example, a CPU, a ROM, and a RAM, deploys a control program stored in the ROM to the RAM, executes the program in the CPU, controls each unit in the image pickup apparatus accordingly, and thereby realizes an operation of the image pickup apparatus including various operations described below. CPU is an abbreviation for "Central Processing Unit". ROM is an abbreviation for "Read Only Memory". RAM is an abbreviation for "Random Access Memory".

The operation unit 117 has a release button that is configured such that a first switch (SW1) and a second switch (SW2) are turned on sequentially depending on a pressing amount. When the release button is half-pressed, the release switch (SW1) is turned on, and when the release button is fully pressed down, the release switch (SW2) is turned on. When the release switch (SW1) is turned on, the control unit 119 calculates an AF evaluation value based on the display video signal output to the display unit 112 by the video signal processing unit 111. Subsequently, the control unit 119 performs automatic focusing detection by controlling the focus drive unit 108 based on the AF evaluation value.

Additionally, the control unit 119 performs AE processing that determines a diaphragm value and a shutter speed for obtaining a proper exposure amount based on luminance information of the video signal and a program diagram determined beforehand. When the release switch (SW2) is turned on, the control unit 119 performs shooting using the determined diaphragm value and the shutter speed, and controls each of processing units so as to store the image data obtained at the imaging unit 109 in the storage unit 118.

The operation unit 117 further has an image shake correction switch that allows selecting a shake correction mode. When the shake correction mode is selected by the image shake correction switch, the control unit 119 provides an instruction for the image shake correction operation to the image shake correction lens drive unit 104, and the image shake correction lens drive unit 104 that received the instruction performs the image shake correction operation until the instruction to turn off the image shake correction is provided. Additionally, the operation unit 117 has a shooting mode selection switch that allows selecting either of a still image shooting mode or a moving image shooting mode. Through the selection of the shooting mode by the operation of the shooting mode selection switch, the control unit 119 can change the operating condition of the image shake correction lens drive unit 104. The image shake correction device of the present embodiment is configured by the image shake correction lens drive unit 104.

Additionally, the operation unit 117 further has a playback mode selection switch for selecting a playback mode. When the playback mode is selected by the operation of the playback mode selection switch, the control unit 119 stops the image shake correction operation. Additionally, the operation unit 117 includes a magnification change switch that provides an instruction for a zoom magnification change. When the instruction for the zoom magnification change is provided by the operation of the magnification change switch, the zoom drive unit 102 that received the instruction via the control unit 119 drives the zoom unit 101, and moves the zoom unit 101 to the instructed zoom position.

Figure 2:
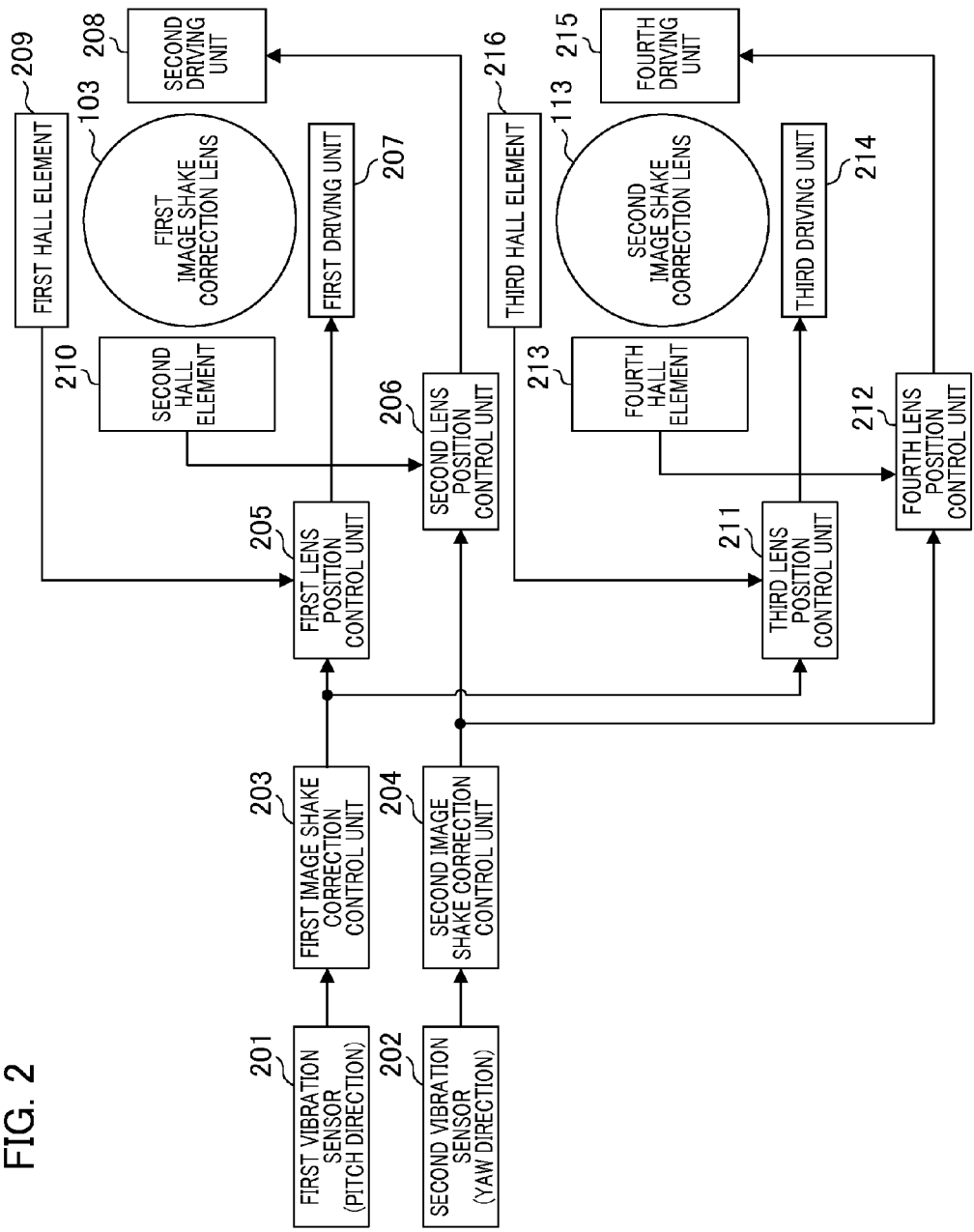
FIG. 2 is a diagram illustrating a configuration of the image shake correction device of the present embodiments.

FIG. 2 is a diagram illustrating a configuration example of the image shake correction device provided in the image pickup apparatus. In this example, a first vibration sensor 201 is an angular velocity sensor. The first vibration sensor 201 detects a vibration in a perpendicular direction (pitch direction) of the image pickup apparatus, in a normal attitude (attitude in which a length direction of the image is approximately coincident to a horizontal direction). A second vibration sensor 202 is an angular velocity sensor, and detects a vibration in the horizontal direction (yaw direction) of the image pickup apparatus in the normal attitude. That is, the first vibration sensor 201 and the second vibration sensor 202 function as detection units that detect the shake applied to the apparatus. A first image shake correction control unit 203 outputs a correction position control signal of the image shake correction lens in the pitch direction, and controls the drive of the image shake correction lens. A second image shake correction control unit 204 outputs the correction position control signal of the image shake correction lens in the yaw direction, and controls the drive of the image shake correction lens.

A first lens position control unit 205 performs feedback control by using the correction position control signal in the pitch direction output from the first image shake correction control unit 203 and by using position information of the image shake correction lens in the pitch direction from a first Hall element 209. Hence, the first lens position control unit 205 drives, for example, a first drive unit 207, which serves as an actuator. Similarly, a second lens position control unit 206 performs the feedback control by using the correction position control signal in the yaw direction output from the second image shake correction control unit 204 and by using position information of the image shake correction lens in the yaw direction from a second Hall element 210. Hence, the second lens position control unit 206 drives, for example, a second drive unit 208, which serves as an actuator.

Next, a description will be given of a drive control operation of the first image shake correction lens 103 by the image shake correction lens drive unit 104. A shake signal (angular velocity signal) that indicates the shake of the image pickup apparatus in the pitch direction from the first vibration sensor 201 is supplied to the first image shake correction control unit 203. Additionally, the shake signal (angular velocity signal) that indicates the shake of the image pickup apparatus in the yaw direction from the second vibration sensor 202 is supplied to the second image shake correction control unit 204.

The first image shake correction control unit 203 generates the correction position control signal that drives the first image shake correction lens 103 in the pitch direction based on the supplied shake signal, and outputs the signal to the first lens position control unit 205. Additionally, the second image shake correction control unit 204 generates the correction position control signal that drives the first image shake correction lens 103 in the yaw direction based on the supplied shake signal, and outputs the signal to the second lens position control unit 206.

The first Hall element 209 outputs a signal having voltage depending on the intensity of a magnetic field due to magnets provided at the periphery of the first image shake correction lens 103, which serves as the position information of the first image shake correction lens 103 in the pitch direction. The second Hall element 210 outputs the signal having voltage depending on the intensity of the magnetic field due to the magnet provided at the periphery of the first image shake correction lens 103, which serves as the position information of the first image shake correction lens 103 in the yaw direction. The position information is supplied to the first lens position control unit 205 and the second lens position control unit 206.

The first lens position control unit 205 performs feedback control while driving the first drive unit 207 such that the signal value from the first Hall element 209 converges on a correction position control signal value from the first image shake correction control unit 203. Additionally, the second lens position control unit 206 performs feedback control while driving the second drive unit 208 such that the signal value from the second Hall element 210 converges on the correction position control signal value from the second image shake correction control unit 204.

Because there is variation in the position signal values output from the first Hall element 209 and the second Hall element 210, the outputs of the first Hall element 209 and the second Hall element 210 are adjusted such that the first image shake correction lens 103 moves to a predetermined position with respect to the predetermined correction position control signal.

The first image shake correction control unit 203 outputs the correction position control signal that moves the position of the first image shake correction lens 103 so as to cancel the image shake of the subject image, based on the shake information from the first vibration sensor 201.

The second image shake correction control unit 204 outputs the correction position control signal that moves the position of the first image shake correction lens 103 so as to cancel the image shake of the subject image based on the shake information from the second vibration sensor 202. For example, the first image shake correction control unit 203 and the second image shake correction control unit 204 perform filter processing and the like to the shake signal (angular velocity signal) or the shake information, and generate a correction speed control signal or the correction position control signal. Through the above operations, the image shake for a certain level of the shake can be prevented if the shake including the shaking of a hand exists in the image pickup apparatus during shooting.

The drive control operation of the second image shake correction lens 113 by the second image shake correction control unit 204 is similar to that of the first image shake correction lens 103 by the image shake correction lens drive unit 104. That is, the second image shake correction lens control unit 204 generates the correction position control signal for driving the second image shake correction lens 113 in the pitch direction, based on the supplied shake signal, and outputs the signal to a third lens position control unit 211. Additionally, the second image shake correction control unit 204 generates the correction position control signal for driving the second image shake correction lens 113 in the yaw direction, based on the supplied shake signal, and outputs the signal to a fourth lens position control unit 212.

The third lens position control unit 211 performs feedback control while driving a third drive unit 214 such that the signal value from a third Hall element 216 converges on the correction position control signal value from the first image shake correction control unit 203. Additionally, the fourth lens position control unit 212 performs feedback control while driving a fourth drive unit 215 such that the signal value from a fourth Hall element 213 converges on the correction position control signal value from the second image shake correction control unit 204.

Figure 3:
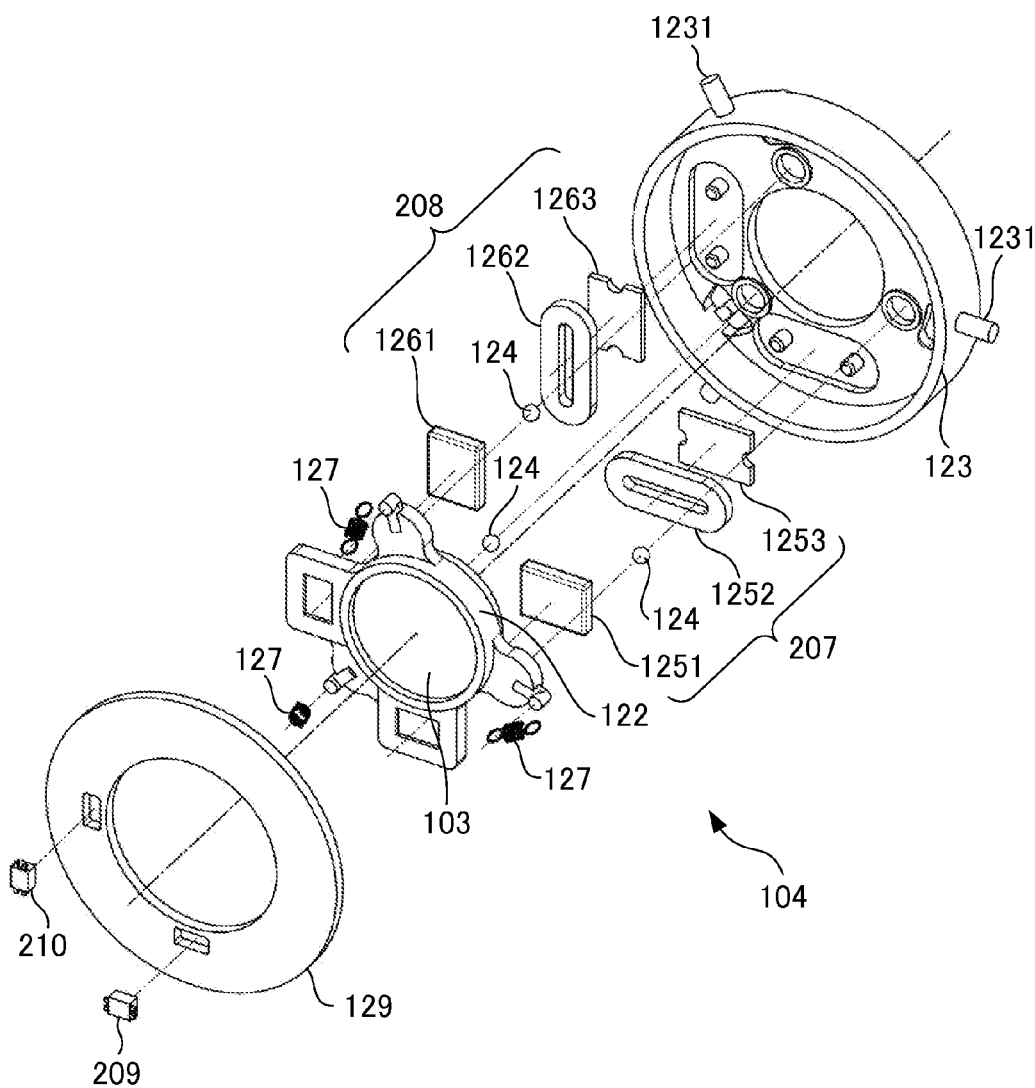
FIG. 3 is an example of an exploded perspective view of an image shake correction lens drive unit.

FIG. 3 is an example of an exploded perspective view of the image shake correction lens drive unit. The image shake correction lens drive unit 104 comprises the first image shake correction lens 103, a movable barrel 122, a fixing plate 123, rolling balls 124, a first electromagnetic drive unit 207, and a second electromagnetic drive unit 208. Additionally, the image shake correction lens drive unit 104 comprises urging springs 127, a first position sensor 209, a second position sensor 210, and a sensor holder 129.

The first electromagnetic drive unit 207 comprises a first magnet 1251, a first coil 1252, and first yoke 1253. The second electromagnetic drive unit 208 comprises a second magnet 1261, a second coil 1262, and a second yoke 1263.

The first image shake correction lens 103 is a first correction optical member that enables making the optical axis eccentric. The first image shake correction lens 103 is driven and controlled by the first image shake correction control unit 203 and the second image shake correction control unit 204. Hence, the image shake correction operation that moves a light figure passed through the imaging optical system is performed, and the stability of the image on an imaging plane can be secured. Note that, in this example, although the correction lens is used as the correction unit that corrects the image shake, the stability of the image on the imaging plane can be secured by also driving the imaging unit such as the CCD with respect to the imaging optical system. That is, the imaging unit may be used as the correction unit that corrects the image shake.

The movable barrel 122 is a first movable unit that holds the first image shake correction lens 103 in the central opening thereof. The movable barrel 122 holds the first magnet 1251 and the second magnet 1252. Additionally, the movable barrel 122 comprises three rolling ball receivers, and is rolled and supported so as to be movable in a plane orthogonal to the optical axis by the rolling ball 124. Additionally, the movable barrel 122 comprises spring hooking parts at three locations, and can hold one end of the urging spring 127.

The fixing plate 123 is a first fixing member that is cylindrically formed. The fixing plate 123 comprises followers 1231 at three locations in the outer periphery thereof. The movable barrel 122 is disposed in the central opening of the fixing plate 123. Hence, a movable amount of the movable barrel 122 can be limited.

Additionally, the fixing plate 123 holds the first coil 1252 and the first yoke 1253 at the positions facing the magnetized surface of the first magnet 1251. Additionally, the fixing plate 123 holds the second coil 1262 and the second yoke 1263 at the positions facing the magnetized surface of the second magnet 1261. Additionally, the fixing plate 123 comprises three rolling ball receivers, and supports the movable barrel 122 so as to be movable in the plane orthogonal to the optical axis via the rolling ball 124. Additionally, the fixing plate 123 comprises three spring hooking parts. Hence, one end of the urging spring 127 is held.

In this example, the first electromagnetic drive unit 207 is a known voice coil motor. A current is supplied to the first coil 1252 attached to the fixing plate 123, and a Lorentz force is generated between the first coil 1252 and the first magnet 1251 fixed to the movable barrel 122 so that the movable barrel 122 can be driven. The second electromagnetic drive unit 208 is arranged by rotating a voice coil motor that is similar to the first electromagnetic drive unit 207 at 90°, and thus the detailed description will be omitted.

The urging spring 127 is a tension spring that generates an urging force proportional to a deformation amount. One end of the urging spring 127 is fixed to the movable barrel 122, the other end thereof is fixed to the fixing plate 123, and the urging force is generated between them. The rolling ball 124 is held by this urging force, and the rolling ball 124 can maintain a condition of contact with the fixing plate 123 and the movable barrel 122.

The position sensor 209 and the position sensor 210 are two magnetic sensors that utilize the Hall element that reads magnetic fluxes of the first magnet 1251 and the second magnet 1261, and can detect the movement of the movable barrel 122 in a plane from the output change.

The sensor holder 129 is configured to have a substantially disk shape, and is fixed to the fixing plate 123. The two position sensors 128 can be held at the positions facing the first magnet 1251 and the second magnet 1261. Additionally, the sensor holder 129 can store the movable barrel 122 in an internal space that is formed with the fixing plate 123. Hence, if an impact force is applied to the image shake correction device or the attitude difference is changed, the parts of the inside can be prevented from dropping out. Through the configuration described above, the image shake correction lens drive unit 104 can move the first image shake correction lens 103 to any position on the plane orthogonal to the optical axis.

Figure 4:
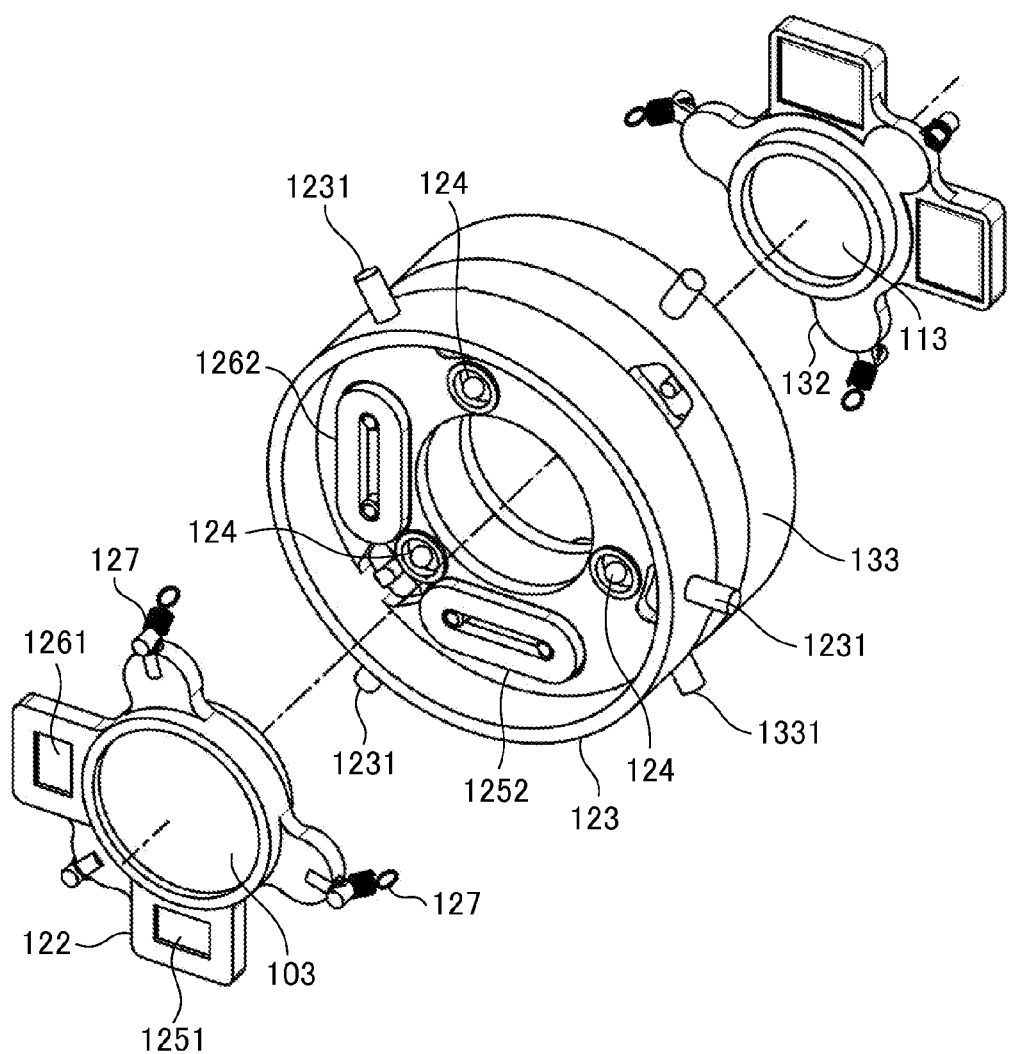
FIG. 4 is a diagram illustrating a configuration of the image shake correction lens drive unit.

FIG. 4 is a diagram illustrating a position relation between the first image shake correction lens and the second image shake correction lens in the image shake correction lens drive unit. In FIG. 4, for convenience of explanation, parts of the image shake correction lens drive unit are exploded or omitted. The movable barrel 132 is a second movable unit comprised in the image shake correction lens drive unit 104 that holds the second image shake correction lens 113 in the central opening. The fixing plate 133 is a second fixing member comprised in the image shake correction lens drive unit 104 that comprises the second image shake correction lens 113. The image shake correction lens drive unit 104 comprising the second image shake correction lens 113 has configuration similar to that of the image shake correction lens drive unit 104 that comprises the first image shake correction lens 103, excluding the lens shape and the shape of the movable barrel 132 holding the lens, and thus the detailed explanation will be omitted.

Figure 5:
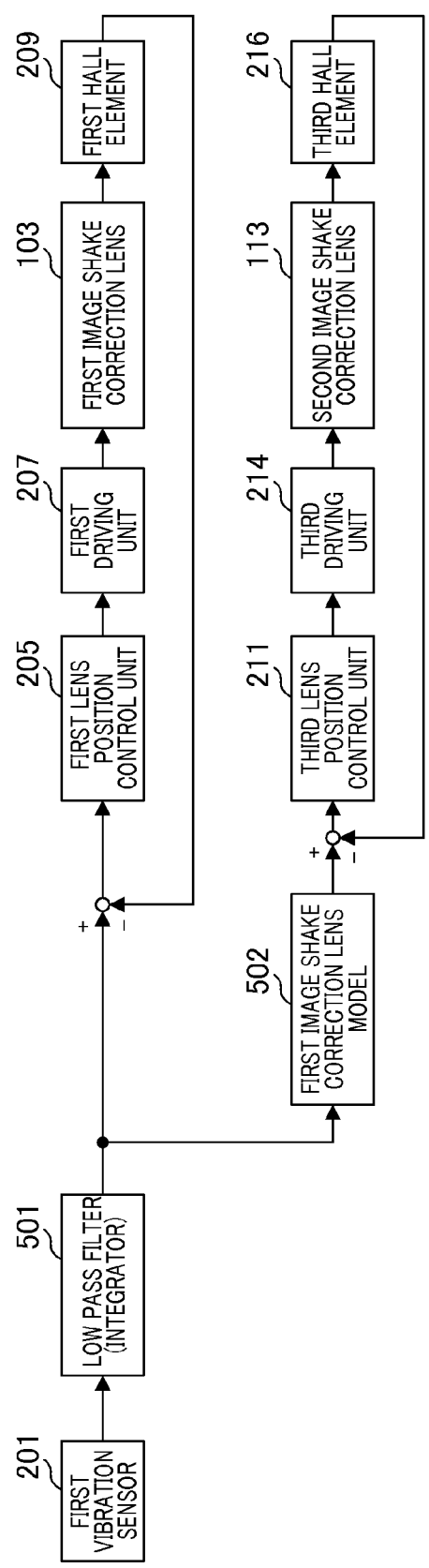
FIG. 5 is a block diagram illustrating an internal configuration of the image shake correction control unit and a lens control unit according to a first embodiment.

FIG. 5 is a diagram illustrating an internal configuration of the image shake correction device of the first embodiment. FIG. 5 illustrates a mechanism that corrects the shake signal in the pitch direction. The explanation of a mechanism that corrects the shake signal in the yaw direction achieved by the second image shake correction control unit 204, the second lens position control unit 206, the fourth lens position control unit 212, the second drive unit 208, and the fourth drive unit 215 will be omitted because the mechanism is similar to that shown in FIG. 5.

The first vibration sensor 201 detects the shake signal (angular velocity signal) that indicates the shake applied to the image pickup apparatus. The first image shake correction control unit 203 comprises an LPF (low pass filter) 501 and a first image shake correction lens model 502. The shake signal detected by the first vibration sensor 201 is integrated by the LPF 501, and it is converted into an angle signal from the angular velocity signal.

The angle signal output from the LPF 501 is input to the first lens position control unit 205 as the signal indicating the target position of the first image shake correction lens (target position signal). The position information of the first image shake correction lens 103 detected by the first Hall element 209 is compared with the target position of the first image shake correction lens, and the control output is calculated in the first lens position control unit 205 such that a deviation between the target position of the first image shake correction lens and the lens position becomes zero. Subsequently, the image shake correction operation is executed by the position feedback control via the first drive unit 207 according to the calculated control output.

In contrast, the control unit 119 inputs the angle signal output from the low pass filter 501 to the first image shake correction lens model 502, and performs signal processing by using the first image shake correction lens model 502. The first image shake correction lens model 502 is a lens model having a drive characteristic (frequency characteristic, in this example) with respect to the target value of the first image shake correction lens 103. The angle signal to which the signal processing is performed by the first image shake correction lens model 502 is input to the third lens position control unit 211 as the target position signal that indicates the target position of the second image shake correction lens. The position information of the second image shake correction lens 113 detected by the third Hall element 216 is compared with the target position of the second image shake correction lens, and the control output is calculated in the third lens position control unit 211 such that a deviation between the target position of the second image shake correction lens and the lens position becomes zero. Subsequently, the third drive unit 214 drives the second image shake correction lens 113 according to the calculated control output, and thus the image shake correction operation is executed.

Figure 6A:
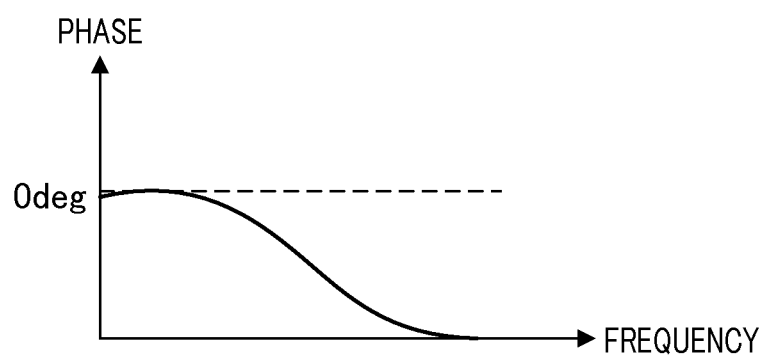
FIG. 6A and FIG. 6B are flowcharts that explain target position calculation processing of the image shake correction lens according to the first embodiment.
Figure 6B:
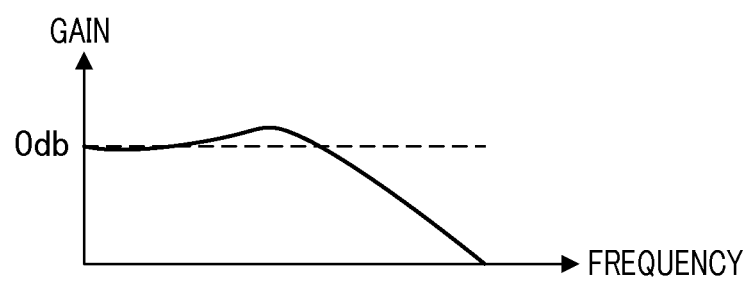

FIG. 6 is a diagram illustrating a frequency characteristic of the first image shake correction lens model. FIG. 6A illustrates a phase difference characteristic of an output signal with respect to an input signal corresponding to the frequency. A horizontal axis indicates the frequency, and a vertical axis indicates the phase difference characteristic of the output signal with respect to the input signal. FIG. 6B illustrates magnification of the amplitude of the output signal by decibel units with respect to the input signal corresponding to the frequency. The frequency characteristic shown in FIG. 6A and FIG. 6B indicates a closed loop transfer characteristic (frequency characteristic) to the position signal of the first image shake correction lens detected at the first Hall element 209 with respect to the angle signal that is output from the low pass filter 501. The first image shake correction lens model 502 is configured by a mathematical model that indicates the frequency characteristic of the phase difference and the amplitude difference (phase characteristic and gain characteristic) of the position of the first image shake correction lens 103 with respect to the target position of the first image shake correction lens 103. Specifically, the first image shake correction lens model 502 is configured by a digital filter and an electric circuit.

Any lens model representing the above frequency characteristic may be used as the first image shake correction lens model 502. The first image shake correction lens model 502 may be provided for each drive condition including any one of at least a temperature change, drive amplitude, or a lens focal length. Subsequently, the control unit 119 may change the first image shake correction lens model 502 to be used depending on the drive condition, when the frequency characteristic changes depending on the drive condition including the temperature change, the drive amplitude, and the lens focal length. Thus, the signal to which the phase characteristic and the gain characteristic that are represented by the first image shake correction lens model 502 are taken into account serves as the target position signal of the second image shake correction lens, so that a drive deviation due to the difference between the drive characteristics of the first image shake correction lens 103 and the second image shake correction lens 113 can be corrected. It is assumed that the difference between the drive characteristics influences the difference in friction characteristic, lens responsiveness, and a control bandwidth.

Any control calculator may be used as the first lens position control unit 205 and the third lens position control unit 211. In this example, PID controllers are used as the first lens position control unit 205 and the third lens position control unit 211.

FIG. 7 is a flowchart that explains calculation processing of the target position of the image shake correction lens by the image shake correction device of the first embodiment. The calculation of the image shake correction control is executed at constant periodic intervals. First, when the processing starts (step S101), the first vibration sensor 201 obtains the image shake signal (step S102). Subsequently, the LPF 501 integrates the output value of the obtained image shake signal, converts it from the angular velocity information to the angle information (image shake angle signal), and outputs it (step S103).

Next, the control unit 119 inputs the output value of the LPF 501 to the first lens position control unit 205 (step S104). Thereby, the first image shake correction lens 103 is driven and the image shake correction is performed. Subsequently, the control unit 119 inputs the image shake angle signal output in the step S103 to the first image shake correction lens model 502 (step S105).

Next, the control unit 119 performs signal processing of the image shake angle signal by the first image shake correction lens model (step S106). Specifically, the control unit 119 processes the image shake angle signal by the digital filter representing the frequency transfer characteristic with respect to the target position of the first image shake correction lens, and outputs it. The control unit 119 inputs the output of the first image shake correction lens model to the third lens position control unit 211. Hence, the second image shake correction lens is driven in synchronization with the first image shake correction lens. That is, the control unit 119 functions as the control unit that executes the correction of the image shake due to the drive of the first image shake correction lens and the second image shake correction lens after correcting the drive deviation between the first image shake correction lens and the second image shake correction lens. According to the present embodiment, the influence of the image shake applied to the image pickup apparatus is removed while reducing the optical performance deterioration caused by the deviation of the synchronized drive of the shake correction lenses.

In the first embodiment, the relation of the image shake correction angles with respect to each of drive strokes of the first and second image shake correction lenses is considered to be identical, and the target position to the first image shake correction lens and the target position of the second image shake correction lens are input to the first and third lens position control units. When the correction angles with respect to the drive strokes of the first image shake correction lens and the second image shake correction lens are different, a coefficient that takes into consideration the image shake correction angles with respect to the drive strokes of the first image shake correction lens and the second image shake correction lens is integrated to each of the target positions of the image shake correction lenses.

Second Embodiment

FIG. 8 is a diagram illustrating an internal configuration of the image shake correction device of the second embodiment. The configuration of the image shake correction device of the second embodiment, except for the image shake correction control unit 203, is similar to the first embodiment, and thus, the explanation thereof will be omitted. The second image shake correction control unit 204, the second lens position control unit 206, and the fourth lens position control unit 212 have similar configurations as the configurations shown in FIG. 8, and thus, the explanation thereof will be omitted.

As shown in FIG. 8A, the image shake signal detected by the first vibration sensor 201 is integrated by the LPF 501, and converted into the angle information (image shake angle signal) by using the angular velocity information. The image shake angle signal is input to the first lens position control unit 205 serving as the target position of the first image shake correction lens 103, it is compared with the position information of the first image shake correction lens 103 detected by the first Hall element 209, and the control output is calculated such that a deviation signal becomes zero. Subsequently, the image shake correction operation is executed by the position feedback control via the first drive unit 207 according to the calculated control output.

In the second embodiment, the target position of the second image shake correction lens 113 is indicated by a signal in which a high-frequency noise of the position signal of the first image shake correction lens 103 detected by the first Hall element 209 is cut by the LPF 801, and the signal is input to the third lens position control unit 211. The position signal of the first image shake correction lens 103 input as described above and the position information of the second image shake correction lens 113 detected by the third Hall element 216 are compared, and the control output is calculated such that the deviation signal becomes zero. Subsequently, the second image shake correction lens is driven by the position feedback control via the third drive unit 214 corresponding to the calculated control output. That is, the control unit 119 detects the position signal indicating the position of the first image shake correction lens 103 to be driven, and drives the second image shake correction lens 113 based on the signal in which the high-frequency component of the detected position signal has been cut.

FIG. 9 is a flowchart that explains calculation processing of the target position of the image shake correction lens by the image shake correction device of the second embodiment. The steps from S102 to S104 are similar to the steps from S102 to S104 in FIG. 7. In a step S901, the control unit 119 inputs the position information of the first image shake correction lens obtained by the first Hall element 209 to the LPF 801 and cuts the high-frequency component (step S901). Subsequently, the control unit 119 inputs the position information of the first image shake correction lens in which the high-frequency component has been cut to the third lens position control unit (step S902). Hence, the second image shake correction lens is driven so as to follow to the first image shake correction lens position. The reason for cutting the high-frequency component from the position information of the first image shake correction lens by the LPF 801 is to prevent the drive of the second image shake correction lens with a high-frequency due to a high-frequency noise included in the position information of the first image shake correction lens.

According to the image pickup apparatus of the second embodiment, the position of the second image shake correction lens is driven in synchronization with that of the first image shake correction lens, and thus, the influence of the image shake applied to the image pickup apparatus is removed while reducing the deterioration of the optical performance due to the deviation of the synchronized drive of the shake correction lenses. As described above, the drive target position of the second image shake correction lens serves as the position of the first image shake correction lens, and thus, the signal that takes into consideration a following characteristic with respect to the image shake angle signal of the first image shake correction lens becomes a target value of the second image shake correction lens. Accordingly, the difference in the drive characteristics between the two lenses is absorbed, the drive is controlled, and thus, the two lenses can be driven in synchronization. Additionally, according to the configuration of the second embodiment, it is possible to drive the second image shake correction lens in synchronization with the first image shake correction lens if the drive characteristic of the first image shake correction lens changes with respect to the age deterioration, the temperature change, and the like.

In a case where the drive characteristics of the first image shake correction lens and the second image shake correction lens are close, as shown in FIG. 8B, the control unit 119 performs the control of adding the control amount that was calculated by the position control of the first image shake correction lens to the control amount of the second image shake correction lens. The configuration shown in FIG. 8B utilizes an actual control target in place of the model in which the known model following control system is configured by the mathematical model, and the first image shake correction lens is used as a reference model of the second image shake correction lens in place of the mathematical model. That is, the control unit 119 drives the first image shake correction lens 103 by using the control signal calculated based on the shake signal (output signal of the first lens position control unit 205), and detects the position signal indicating the position of the first image shake correction lens 103 (output signal of the first Hall element 209). Subsequently, the control unit 119 drives the second image shake correction lens 113 based on the signal in which the high-frequency component of the detected position signal is cut and the above control signal. Hence, when the drive characteristics of the two image shake correction lenses are close, the position control amount of the first image shake correction lens is utilized to that of the second image shake correction lens, and thus, the second image shake correction lens is readily allowed to further follow the position of the first image shake correction lens.

Other Embodiments

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-145760, filed Jul. 16, 2014, which is hereby incorporated by reference herein in its entirety.

What is claimed is:
1. An image shake correction device comprising:
a first correction unit configured to optically correct, by moving a first correction member, an image shake of a subject image caused by shaking;
a second correction unit configured to optically correct, by moving a second correction member, an image shake of a subject image caused by shaking, the second correction unit being disposed along an optical axis at a location that is different from that of the first correction unit; and
a processor executing a program stored in a memory so as to function as a control unit configured to control an execution of the correction of the image shake by control of the first correction unit and the second correction unit after correcting a drive deviation between the first correction unit and the second correction unit,
wherein the control unit controls the first correction unit based on a shake signal indicating shaking detected by a detection unit,
wherein the control unit processes the shake signal by using a lens model having a drive characteristic with respect to a target position of the first correction unit, and controls the second correction unit based on the processed shake signal, wherein the lens model is configured by a mathematical model indicating a frequency characteristic of a phase difference and an amplitude difference of a position of the first correction unit with respect to the target position of the first correction unit, and wherein the control unit processes the shake signal by using the mathematical model to output a target position signal of the second correction unit for controlling the second correction unit in synchronization with the first correction unit, and thereby controls the second correction unit based on the target position signal.

2. An image pickup apparatus comprising an image shake correction device according to claim 1.

3. An image shake correction device comprising:
a first correction unit configured to optically correct, by moving a first correction member, an image shake of a subject image caused by shaking;
a second correction unit configured to optically correct, by moving a second correction member, an image shake of a subject image caused by shaking, the second correction unit being disposed along an optical axis at a location that is different from that of the first correction unit; and
a processor executing a program stored in a memory so as to function as a control unit configured to control an execution of the correction of the image shake by control of the first correction unit and the second correction unit after correcting a drive deviation between the first correction unit and the second correction unit,
wherein the control unit controls the first correction unit based on a shake signal indicating shaking detected by a detection unit,
wherein the control unit processes the shake signal by using a lens model having a drive characteristic with respect to a target position of the first correction unit, and controls the second correction unit based on the processed shake signal,
wherein the lens model is provided for each drive condition including any one of at least a temperature change, drive amplitude, or a lens focal length, and
wherein the control unit changes the lens model used for the processing of the shake signal, depending on the drive condition.

4. An image pickup apparatus comprising an image shake correction device according to claim 3.

5. An image shake correction device comprising:
a first correction unit configured to optically correct, by moving a first correction member, an image shake of a subject image caused by shaking;
a second correction unit configured to optically correct, by moving a second correction member, an image shake of a subject image caused by shaking, the second correction unit being disposed along an optical axis at a location that is different from that of the first correction unit; and
a processor executing a program stored in a memory so as to function as a control unit configured to control an execution of the correction of the image shake by a control of the first correction unit and the second correction unit after correcting a drive deviation between the first correction unit and the second correction unit,
wherein the control unit controls the first correction unit based on a shake signal indicating shaking detected by a detection unit, and wherein the control unit obtains a position signal indicating a position of the first correction unit to be controlled, and controls the second correction unit based on a signal in which a high-frequency component of the obtained position signal has been cut.

6. The image shake correction device according to claim 5, wherein the control unit controls the second correction unit based on (a) a signal in which a high-frequency component of the obtained position signal has been cut and (b) the control signal used for the control of the first correction unit.

7. An image pickup apparatus comprising an image shake correction device according to claim 5.

8. A control method of an image shake correction device including (a) a first correction unit for correcting an image shake of a subject image caused by shaking and (b) a second correction unit for correcting an image shake of a subject image caused by shaking, the second correction unit being disposed along an optical axis at a location that is different from that of the first correction unit, the method comprising:
a first control process that controls the first correction unit based on a shake signal indicating shaking detected by a detection unit,
a processing process that processes the shake signal by using a lens model having a drive characteristic with respect to a target position of the first correction unit, and
a second control process that controls the second correction unit based on the processed shake signal,
wherein the lens model is configured by a mathematical model indicating a frequency characteristic of a phase difference and an amplitude difference of a position of the first correction unit with respect to the target position of the first correction unit,
wherein, in the processing process, the shake signal is processed by using the mathematical model to output a target position signal of the second correction unit for controlling the second correction unit in synchronization with the first correction unit, and
wherein, in the second control process, the second correction unit is controlled based on the target position signal.

9. A control method of an image shake correction device including (a) a first correction unit for correcting an image shake of a subject image caused by shaking and (b) a second correction unit for correcting an image shake of a subject image caused by shaking, the second correction unit being disposed along the optical axis at a location that is different from that of the first correction unit, the method comprising:
a first control process that controls the first correction unit based on a shake signal indicating shaking detected by a detection unit;
a processing process that processes the shake signal by using a lens model having a drive characteristic with respect to a target position of the first correction unit; and
a second control process that controls the second correction unit based on the processed shake signal,
wherein the lens model is provided for each drive condition including any one of at least a temperature change, drive amplitude, or a lens focal length, and
wherein, in the processing process, the lens model used for the processing of the shake signal is changed depending on the drive condition.

10. A control method of an image shake correction device including (a) a first correction unit for correcting an image shake of a subject image caused by shaking and (b) a second correction unit for correcting an image shake of a subject image caused by shaking, the second correction unit being disposed along an optical axis at a location that is different from that of the first correction unit, the method comprising:
- a first control process that controls the first correction unit based on a shake signal indicating shaking detected by a detection unit;
- obtaining a position signal indicating a position of the first correction unit to be controlled; and
- a second control process that controls the second correction unit based on a signal in which a high-frequency component of the obtained position signal has been cut.

* * * * *